(No Model.)

E. R. STABLER.
LAWN MOWER.

No. 497,420. Patented May 16, 1893.

Witnesses:
Chas. W. Parker
G. M. Copenhaver.

Inventor
Edward R. Stabler,
by H. N. Low
atty.

UNITED STATES PATENT OFFICE.

EDWARD R. STABLER, OF BRIGHTON, MARYLAND.

LAWN-MOWER.

SPECIFICATION forming part of Letters Patent No. 497,420, dated May 16, 1893.

Application filed August 23, 1892. Serial No. 443,887. (No model.)

*To all whom it may concern:*

Be it known that I, EDWARD R. STABLER, a citizen of the United States, residing at Brighton, in the county of Montgomery, State of Maryland, have invented certain new and useful Improvements in Lawn-Mowers; and I do declare the following to be a full, clear, and exact description of the invention, such as will enable others skilled in the art to which it appertains to make and use the same.

It is the object of my invention to provide improved cutting devices for lawn mowers which shall enable the severing of the grass to be more perfectly performed, shall obviate the frequent setting and adjusting of the fixed knife bar, and shall permit the knives to be readily sharpened without that exercise of care and skill which is ordinarily necessary to insure a perfect contact between the rotary and stationary knives for their full length.

My improvement consists in a fixed knife blade (so called in distinction from the revolving blades) adapted to be held by a spring or yielding pressure against the revolving blades and provided with a forward projection extending beyond the edge of the fixed blade and in the direction from which the latter is approached by the revolving blades.

My improvement further consists in certain parts and combinations thereof hereinafter more particularly set forth and claimed.

In order to make my invention more clearly understood I have shown in the accompanying drawings means for carrying the same into practical effect, without however limiting the improvement in its useful applications to the particular construction which, for the sake of illustration, I have delineated.

Figure 1:
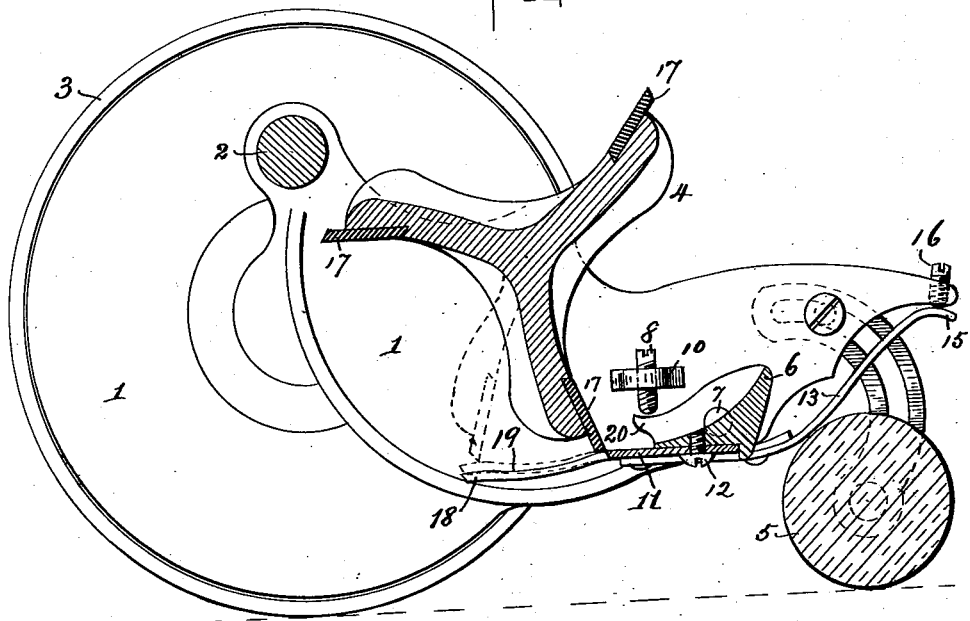
Figure 2:
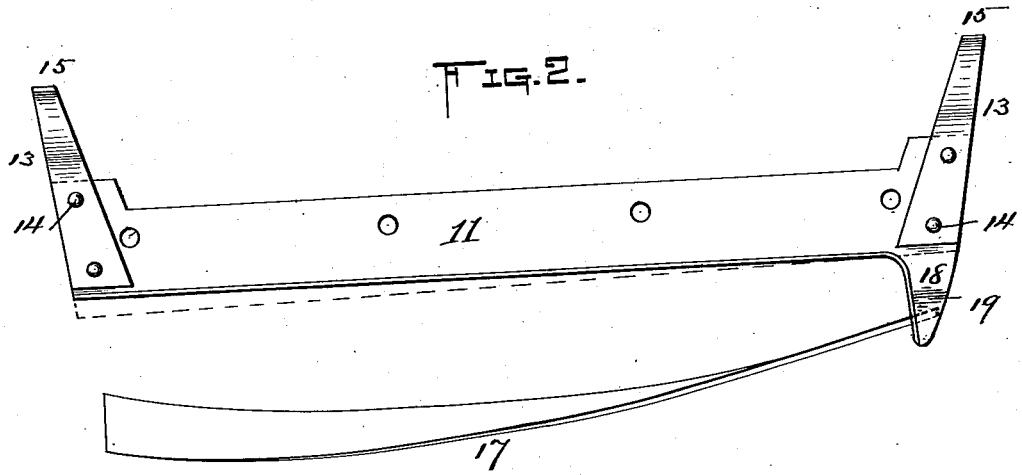

In said drawings—Figure 1 is a transverse vertical sectional view of a lawn mower embodying my invention. Fig. 2 is a plan view of the fixed blade, showing also one of the rotary blades.

Referring to the drawings: 1 indicates one of the side frames or castings of the mower, 2 a cross bar connecting the side frames, 3 one of the ground wheels, 4 the revolving cutter cylinder or reel journaled in the side frames and actuated from the ground wheels by gearing in a well known manner, and 5 the ground roller adjustably mounted on the mower frame to regulate the height of cut. The handle is not shown, it being immaterial to an understanding of my invention.

6 is the fixed knife bar—so called—extending across the machine in proximity to the path of the revolving cutter edges. It is mounted upon pivots 7, journaled or fixed in the frame, so as to be capable of free oscillatory movement within certain limits. It is held from turning too far toward the revolving cutters by a positive stop preferably formed by the rear end of the previous revolving blade which may be arranged to be in contact with the end of the fixed blade at the instant the forward end of the succeeding blade runs onto the extension 18. If the blades are made on a steep helix so that the preceding blade cannot have this function, a stop may be formed by a screw 8 mounted in an ear 10 on the frame 1. This screw will not interfere with the free action of the fixed blade in maintaining contact with the revolving blade at all parts of and for the full length of the latter, and will only operate momentarily at the instant between the leaving of the fixed blade by the preceding revolving blade and the encountering of it by the succeeding revolving blade. I however prefer the first mentioned construction in which the preceding blade acts as the stop, for the reason that it is less apt to get out of order or be misadjusted, and because the cut of the machine will then be continuous. The bar 6 is free to turn in the reverse direction, such turning being however resisted by springs as hereinafter more particularly described.

11 indicates the blade of the so called fixed knife, mounted upon the bar 6 to which it is secured by screws 12.

The springs by which the knife 11 is controlled and kept in contact with the revolving blade for the full length are indicated at 13, and consist of steel or equivalent elastic strips riveted to the blade 11 at 14 and bearing at their free ends 15 upon a suitable part of the frame or other equivalent stops. In the construction illustrated the stops for the springs are formed, one at each side of the machine, by screws 16 mounted in the frame. By turning these screws the proper tension may be independently imparted to the springs. These screws may however be dispensed with.

A blade having these rearwardly extending springs 13 is adapted to be applied to a mower of ordinary construction and have the said springs bear properly against the mower frame, as indicated in the drawings.

It remains to describe the means by which it is insured that the revolving knives, which are shown at 17, shall run smoothly onto the edge of the fixed knife blade without abrupt shock or jar which would check the revolution of the knife and thus add greatly to the labor of propelling the machine. 18 indicates a forward extension which is part of or fixed to the blade 11. It is situated at that end of the blade which, by reason of the helical shape of the revolving blades, is first encountered by the latter. This extension is preferably of the contour seen in Fig. 1, slightly curved or concaved on its upper face at 19 to approximate the path of the revolving blade and cause the latter to encounter the extension with the least abruptness and when moving almost parallel with the blade's surface. At its extremity the extension is so situated that if momentarily no revolving blade is acting on the fixed blade, and the shoulder 20 of the bar 6 is in contact with the screw 8, it will nevertheless be beyond or outside of the path of the edges of the revolving blades. If the screw 8 is not used, and the rear end of the preceding blade serves as the stop, the extension will be of such length that it will be outside of the said path and ready to receive the advancing blade at the time when the rear end of the preceding blade is on the last portion of the fixed blade. By the use of this extension the revolving blade is guided in the most certain manner upon the fixed blade, without the necessity for nice adjustment of the parts, and pressure to turn the bar 6 with its knife is first applied at a considerable distance from the pivots 7. In other words the fixed blade may accommodate itself gradually to the revolving blade during the interval which the latter is moving along the extension instead of all at once at the instant the edges of the blades are opposite each other. By giving sufficient twist to the revolving blades the forward end of one blade may be caused to encounter the extension 18 before the rear end of the preceding blade has left the edge of the fixed blade, as already mentioned, thereby requiring less movement of the fixed blade as it changes from one knife to the other. In this case the end of the fixed blade which is opposite to that on which is the extension 18, and which is last in contact with the revolving blade, may be set slightly in advance of the end having the extension (see dotted lines in Fig. 2) thus increasing the force of contact between the blades at or near the end of their cut and preventing the succeeding knife from separating, by its contact with the extension, the other end of the fixed blade from the rear portion of the preceding revolving knife.

It will be understood that the blade as shown in Fig. 2 may be manufactured and sold for an attachment to the fixed knife bar of many lawn mowers already in use or on the market, it being a matter of little difficulty to substitute this blade for the ordinary fixed blade, at the same time releasing the ordinary pivoted and adjustable knife bar so that it may have free oscillatory movement.

Having thus described my invention, what I claim is—

1. In a lawn mower the combination with the revolving knife or knives, and their actuating mechanism, of a yielding fixed knife having at one end a forward extension to receive the edge of the revolving knife, substantially as set forth.

2. The combination with the revolving knives, of a fixed knife having at one end the extension 18, and having the other end set in advance of the first mentioned end and springs for pressing the fixed knife toward the path of the revolving knives, substantially as set forth.

3. In a lawn mower the combination with the revolving knife, of an oscillating fixed knife having the rearwardly extending springs 13 attached thereto and adapted to bear at their extreme rear ends against the rear portion of the mower frame, whereby said knife may be used as an attachment with the ordinary form of mower frame, substantially as set forth.

4. As an attachment for the fixed knife bar of lawn mowers the herein described blade having the extension 18 and springs 13, substantially as set forth.

In testimony whereof I affix my signature in the presence of two witnesses.

EDWARD R. STABLER.

Witnesses:
EDWARD PEIRCE,
W. H. GILPIN.